US 6,204,629 B1

(12) United States Patent
Rote et al.

(10) Patent No.: US 6,204,629 B1
(45) Date of Patent: Mar. 20, 2001

(54) METHOD AND APPARATUS FOR ACCURATELY MEASURING A BACK-EMF VOLTAGE ON AN ACTUATOR COIL

(75) Inventors: John K. Rote, Addison; Lindian Wayne Reynolds, Jr., Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/193,803

(22) Filed: Nov. 17, 1998

Related U.S. Application Data
(60) Provisional application No. 60/066,338, filed on Nov. 27, 1997.

(51) Int. Cl.[7] .................................................. H02P 5/06
(52) U.S. Cl. ................................................. 318/803; 360/75
(58) Field of Search ........................... 318/362, 375–377, 318/379; 388/803, 806, 815, 822, 928.1; 360/73.01, 73.03, 73.09, 74.01, 75, 77.02, 77.08

(56) References Cited

U.S. PATENT DOCUMENTS

| | | | |
|---|---|---|---|
| 4,200,827 | 4/1980 | Oswald | ................................ 318/561 |
| 4,786,995 | * 11/1988 | Stupeck et al. | ........................ 360/75 |
| 4,831,469 | * 5/1989 | Hanson et al. | .......................... 360/75 |
| 4,866,554 | * 9/1989 | Stupeck et al. | ........................ 360/105 |
| 5,325,030 | * 6/1994 | Yamamura et al. | ................. 318/563 |
| 5,384,524 | * 1/1995 | Romano | ................................. 318/569 |
| 5,455,496 | * 10/1995 | Williams et al. | ..................... 318/563 |
| 5,491,394 | 2/1996 | Harwood et al. | ..................... 318/563 |
| 5,495,156 | * 2/1996 | Wilson et al. | ........................ 318/368 |
| 5,504,402 | * 4/1996 | Menegoli | ............................. 318/377 |
| 5,566,369 | * 10/1996 | Carobolante | ........................... 360/75 |
| 5,615,064 | * 3/1997 | Blank et al. | ............................. 360/75 |
| 5,838,515 | 11/1998 | Mortazavi et al. | ............... 360/78.12 |

FOREIGN PATENT DOCUMENTS 0 461 915 A2   12/1991   (EP) .

* cited by examiner

Primary Examiner—Robert E. Nappi
Assistant Examiner—Rina I. Duda
(74) Attorney, Agent, or Firm—W. Daniel Swayze, Jr.; Wade James Brady, III; Frederick J. Telecky, Jr.

(57) ABSTRACT

An actuator (12) has a movable member (20), and has a coil (26) which can be controlled to urge the member to move. In a particular mode of operation, a driver circuit (70) is periodically uncoupled from the coil so that the current through the coil goes to zero, after which the back-emf voltage of the coil is applied to a capacitor (94). Then, the driver circuit is recoupled to the coil, and the voltage held by the capacitor is used to effect feedback control of the driver circuit for the coil.

11 Claims, 3 Drawing Sheets

METHOD AND APPARATUS FOR ACCURATELY MEASURING A BACK-EMF VOLTAGE ON AN ACTUATOR COIL

This application claims benefit of Provisional Application Ser. No. 60/066338 filed Nov. 27, 1997.

TECHNICAL FIELD OF THE INVENTION

This invention relates in general to control of an actuator and, more particularly, to a method and apparatus for accurately measuring the back electromotive force (emf) voltage on an actuator coil.

BACKGROUND OF THE INVENTION

Conventional actuators have a moveably supported member, and a coil. When a current is passed through the coil, the member is urged to move. A control circuit is coupled to the coil in order to selectively supply current to the coil. One example of such an arrangement is a hard disk drive, where the moveable member of the actuator supports a read/write head adjacent a rotating magnetic disk for approximately radial movement relative thereto. There are situations in which it is desirable to move the member to one end of its path of travel at a predetermined velocity which is less than its maximum velocity. An example of such a situation is a power failure. The movement of the member to one end of its path of travel is commonly referred to as a retract of the member, and in the context of a hard disk drive corresponds to parking of the read/write head on the member.

When a current is applied to the coil of the actuator, the member is urged to accelerate at a rate defined by the magnitude of the current, and in a direction defined by the polarity of the current. Consequently, in order to accelerate or decelerate the member until it is moving at a desired velocity and in a desired direction, it is important to know the actual direction and velocity of the member. In this regard, it is known that the back-emf voltage on the coil of the actuator is representative of the velocity and direction of movement of the member. While known techniques of measuring the back-emf voltage have been adequate for their intended purposes, they have not been satisfactorily in all respects.

In particular, because a current is being applied to the coil in order to urge movement of the member, and because the actuator has internal resistance, the current flow and resistance together generate voltages which are additional to the back-emf voltage, and which thus obscure accurate measurement of the back-emf voltage. This is complicated by the fact that the internal resistance of the actuator can vary dynamically, due to temperature changes and other factors. One known approach measures the voltage and current applied to the actuator, and calculates the back-emf voltage Vbe as follows, where Rm is the internal resistance of the actuator:

$$Vbe = (I_{applied} \cdot Rm) + (L di/dt) - V_{applied}.$$

(where Ldi/dt is assumed to be approximately=0).

Since the actual value of the actuator resistance Rm will change dynamically, the accuracy of this known technique will fluctuate unpredictably in dependence on whether, at the time of a particular calculation, the actual value of Rm is close to or different from the predetermined constant value used for Rm in the calculation.

A related consideration is that known retract methods control the magnitude of voltage applied across the coil, which is usually adequate for controlling the rate at which the moveable member of the actuator retracts, because the retract rate is proportional to the applied voltage minus the load losses. In some systems, however, the load can change dramatically, which will translate into undesired changes in rate.

A further disadvantage of the foregoing calculation is that a microprocessor or other circuitry needed to solve the equation may be prohibitly complex and expensive, particularly where it is desirable to implement the entire system in a single integrated circuit. Also, in a situation where the power is failing, it is typically impractical to try to maintain sufficient power to a microprocessor to permit it to continue to operate. A further disadvantage is that, when the desired velocity of the moveable member is small, as is the case in most retract scenarios, small changes to the actuator resistance Rm can lead to large errors in the measurement of back-emf voltage using traditional techniques. In extreme cases, this can lead to positive feedback within the control loop, which of course is undesirable.

SUMMARY OF THE INVENTION

From the foregoing, it may be appreciated that a need has arisen for a method and apparatus for accurately measuring the back-emf voltage on an actuator coil, by carrying out the measurement in a manner independent of the internal actuator resistance. According to the present invention, a method and apparatus are provided to address this need, and involve: cyclically effecting and interrupting an electrical coupling between an actuator coil and an output of an actuator driver circuit; applying to a voltage holding circuit, during time intervals when an electrical coupling between the output of the driver circuit and the coil is interrupted, a voltage which represents a back-emf of the coil, the back-emf of the coil representing an actual velocity of a moveable member of the actuator; thereafter causing the voltage holding circuit to hold the voltage while the electrical coupling between the output of the driver circuit and the coil is in effect; and supplying to an input of the driver circuit a feedback signal which is a function of a difference between a desired velocity of the member and the actual velocity of the member as represented by the voltage from the voltage holding circuit, the feedback signal causing the driver circuit to urge the member to move at the desired velocity.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
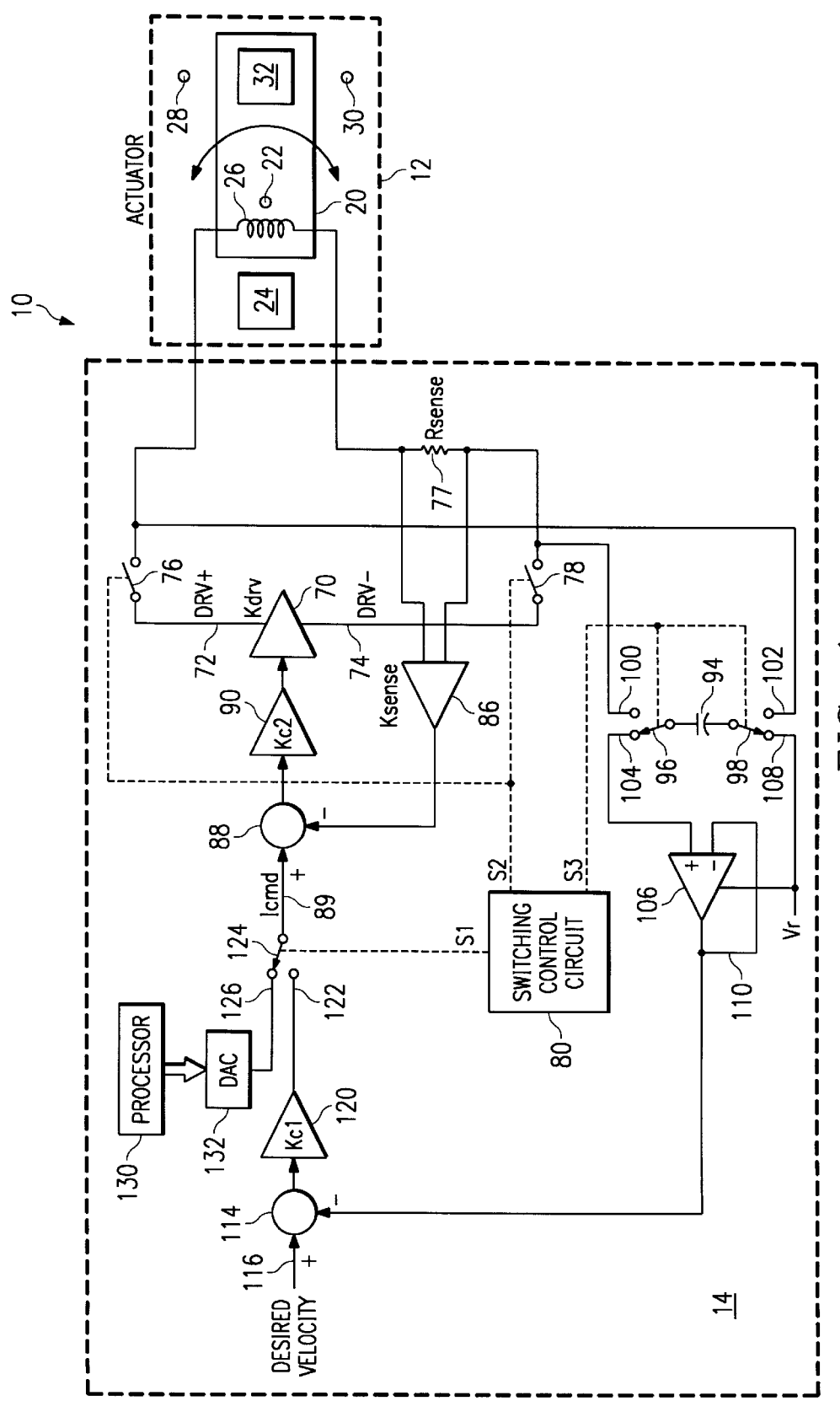
FIG. 1 is a diagrammatic view of a system which includes an actuator, and an actuator control circuit that embodies the present invention.

FIG. 1 is a diagrammatic view of a system which embodies the present invention, and which is designated generally by reference numeral 10. The system 10 includes an actuator 12, and a control circuit 14 for controlling the actuator 12. The system 10 of FIG. 1 is used in a hard disk drive to effect movement of a read/write head relative to a rotating magnetic disk. However, the present invention may be used to control actuators in other types of applications.

The actuator 12 is of a type which is commonly referred to as a voice coil motor, and is sometimes referred to as just a motor. The word actuator is used herein to refer not only to a voice coil motor type of actuator such as that shown in FIG. 1, but also other types of actuators which can be used in conjunction with the present invention.

The actuator 12 includes an elongate arm or member 20, which is pivotly supported near one end on an axle or spindle 22. A permanent magnet 24 is stationarily mounted near the pivotally supported end of member 20, and a coil 26 is mounted on that end of the member 20. The coil 26 has ends which are coupled to the control circuit 14. When a current is passed through the coil 26, it generates a magnetic field which interacts with the magnet 24 so as to urge pivotal movement of the member 20 in a direction corresponding to the polarity of the coil current. In the disclosed embodiment, the coil 26 is provided on the member 20 and the magnet 24 is stationary. Alternatively, however, the coil could be stationarily mounted and the magnet could be mounted on the member.

At one end of its path of travel, the member 20 is engageable with a stationary stop 28 which limits movement of the member 20 in one direction, and at the other end of its path of travel the member 20 is engageable with a further stationary stop 30 which limits movement of the member 20 in the opposite direction. A read/write head 32 is provided on the end of member 20 remote from coil 26. As the member 20 pivots between its limit positions, the read/write head 32 moves approximately radially across a conventional and not-illustrated rotating magnetic disk of a hard disk drive.

Figure 2:
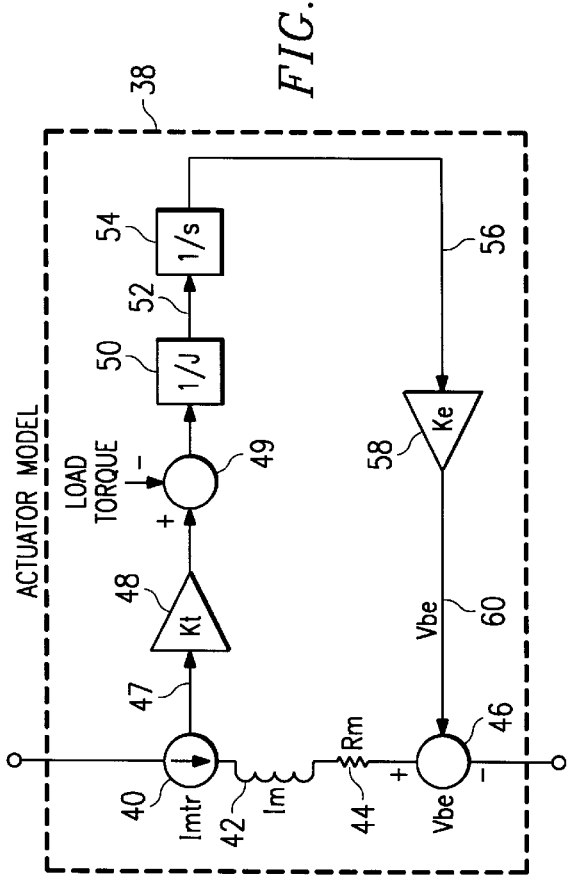
FIG. 2 is a diagrammatic view an idealized model of the actuator in the embodiment of FIG. 1.

An understanding of the present invention will be facilitated by an understanding of certain characteristics of the actuator 12, which in turn are best understood through an explanation of an idealized model of the actuator 12. FIG. 2 depicts an idealized model actuator 38. If the actuator 12 of FIG. 1 were replaced with a circuit implementing the idealized model 38 of FIG. 2, the control circuit 14 of FIG. 1, viewing the actuator as a black box with two terminals, would be unable to see a significant difference between the real actuator 12 and the model actuator 38.

The actuator model 38 includes an ideal current sensor 40, an inductance 42, a resistance 44 and an ideal voltage-controlled voltage source 46, all coupled in series between the two terminals of the actuator model 38. The output 47 of the ideal current sensor 40 is a signal representing the current flowing through the actuator. The signal 47 is coupled to an input of an amplifier 48, which has a gain Kt that represents a torque constant of the moveable member 20 (FIG. 1). The output of the amplifier 48 is coupled to the input of a junction 49, which adjusts the amplifier output using a signal representing a load torque. The output of the junction 49 is coupled to the input of a circuit 50, which makes an adjustment representative of the inertia of the member 20.

The output 52 of the circuit 50 is a signal which represents an acceleration of the member 20. The signal 52 is integrated at 54, in order to obtain a signal 56 which represents the velocity of the member 20. The signal 56 is applied to the input of an amplifier 58 having a gain Ke that represents a back electromotive force (emf) of the actuator. The output 60 of the amplifier 58 is a voltage Vbe which represents the back-emf voltage of the actuator. This voltage is applied to an input of the ideal voltage-controlled voltage source 46, which reproduces this same voltage Vbe across its output terminals. Since the voltage source 46 is ideal, it will produce the output voltage regardless of whether there is any current flowing through source 46.

Since the signal 56 represents the actual velocity of the member 20, and since the back-emf voltage Vbe present at 60 and across source 46 is proportional to the magnitude of signal 56, it will be recognized that the magnitude of the back-emf voltage Vbe across source 46 is an accurate representation of the actual velocity of the member 20. However, when a current is flowing through the actuator model 38, the resistance 44 will produce a voltage which is added to the voltage Vbe across the voltage source 46. Consequently, so long as current is flowing through the actuator model 38, it is not possible to accurately measure the voltage Vbe alone, in order to accurately determine the actual velocity of the moveable member.

Therefore, in order to independently measure the back-emf voltage Vbe and thus determine the actual velocity of the member 20, one feature of the present invention involves terminating the current flow so that the voltage across resistance 44 goes substantially to zero, after which the back-emf voltage Vbe can be measured across the two terminals of the actuator model 38. It is a characteristic of the actuator that the back-emf voltage Vbe will not change significantly as the current flow through actuator model 38 is decreased to zero.

It has been explained, with reference to the model actuator 38 of FIG. 2, that terminating the actuator current allows the back-emf voltage of the actuator to be accurately measured. The same is true of the actual actuator 12 shown in FIG. 1.

Turning now in more detail to FIG. 1, the control circuit 14 includes a driver circuit 70 having a differential output which includes two output terminals 72 and 74. An electronic switch 76 couples the output terminal 72 to one end of the actuator coil 26, the other end of the actuator coil 26 being coupled to one end of a sense resistor 77. A further electronic switch 78 couples the output terminal 74 of the driver circuit 70 to the end of sense resistor 77 remote from the coil 26. The electronic switches 76 and 78 together constitute an electronic switching circuit, and are simultaneously opened and closed under control of a common signal S2 from a switching control circuit 80. At any given point in time, the electronic switches 76 and 78 are both open, or both closed. The operation of the switching control circuit 80 is described in more detail later.

In the disclosed embodiment, the electronic switches 76 and 78 are actually integral to the particular circuitry of the driver circuit 70. However, for purposes of clarity in explaining the present invention, they are shown separately in the diagrammatic view of FIG. 1.

A sense amplifier 86 has two inputs which are coupled to respective ends of the sense resistor 77, and has an output which is coupled to one input of a differential summing junction 88, the other input of the summing junction 88 receiving a signal at 89 which is a current Icmd. The output of the summing junction 88 is coupled to an input of an amplifier 90 having a gain Kc2. The output of the amplifier 90 is coupled to the input of the driver circuit 70.

When the control circuit 14 applies a current to the actuator 12, the actuator 12 urges member 22 to accelerate in one direction or the other. The current Icmd at 89 has a magnitude which specifies a desired rate of acceleration for the member 20, and a polarity which specifies the direction of desired acceleration. If the member 20 is already moving, it will be urged to either accelerate or decelerate, depending on the direction in which it is already moving. The sense resistor 77 and sense amplifier 88 provide to junction 88 feedback representing the actual current flowing through the coil 26 of actuator 12, so that the junction 88 determines a difference between the desired acceleration and the actual acceleration for purposes of effecting feedback control.

The control circuit 14 includes a capacitor 94 which functions as a voltage holding circuit. Two electronic switches 96 and 98 each have a contact, the contacts of switches 96 and 98 being coupled to respective ends of the capacitor 94. The switch 96 has a terminal 100 which is coupled to the node between switch 78 and sense resistor 77, and the switch 98 has a terminal 102 which is coupled to the node between switch 76 and coil 26. The switch 96 also has a terminal 104 which is coupled to one input of a buffer 106 with a high input impedance, and the switch 98 has a terminal 108 which is coupled to a reference voltage Vr that is also supplied to the buffer 106. The buffer 106 is coupled to the system ground in a not-illustrated manner, the reference voltage Vr serving as a virtual ground to which the buffer inputs are referenced, so that the buffer 106 outputs the voltage Vr if there is no voltage differential between its two inputs. The output of buffer 106 is coupled at 110 to a second input of the buffer. The switches 96 and 98 are operated in synchronism so that, at any given point in time, their contacts are coupling the ends of capacitor 94 to the terminals 100 and 102, or coupling the ends of the capacitor to the terminals 104 and 108. The simultaneous control of the switches 96 and 98 is effected by a signal S3 from the switching control circuit 80. Taken together, the electronic switches 96 and 98 constitute an electronic switching circuit.

The output of the buffer 106 is also coupled to one input of a differential summing junction 114, the other input to which is a signal 116 representing a desired velocity. Signal 116 is a predetermined reference voltage in the disclosed embodiment, but could alternatively be a voltage which changes. The output of the junction 114 is coupled to an input of an amplifier 120 having a gain Kc1. The output of the amplifier 120 is coupled to one terminal 122 of a switch 124, the switch 124 having a further terminal 126 and having a contact which is coupled to the input 89 to the junction 88. A digital signal processor 130 has outputs which are coupled to a digital-to-analog converter (DAC) 132, the DAC 132 having an output which is coupled to the switch terminal 126. The electronic switch 124 functions as an electronic switching circuit, and is controlled by a signal S1 from the switching control circuit 80.

During normal operation, the switching control circuit 80 keeps the contact of electronic switch 124 engaged with the terminal 126, so that the processor 130, through the DAC 132, controls the input 89 to junction 88. The processor 130 thus generates signals at 89 which have a magnitude and polarity indicating a rate and direction of desired acceleration for the member 20 of the actuator 12. During normal operation, the switching control circuit 80 uses signal S2 to keep the switches 76 and 78 continuously closed, and uses signal S3 to keep the contacts of switches 96 and 98 in engagement with terminals 104 and 108. The feedback loop which includes elements 88, 90, 70, 77 and 86 thus functions to accelerate and decelerate the member 20 of actuator 12 in accordance with the input signal provided at 89 by the processor 130.

Under certain circumstances, the electronic switch 124 is used to disconnect the processor 130 from effective control of the input 89 to junction 88. One example is where the processor 130 specifies that a controlled retract is to occur. Another example, which will be used as a basis for the following explanation, is where power to the entire system fails. In the event of a power failure, it is important to move the member 20 to one end of its path of travel so that it is engaging one of the stops 28 and 30, which effects "parking" of the read/write head 32 of the hard disk drive. This is sometimes referred to as retracting the member 20. After power has failed, the member 20 can be maintained in the retracted position in a conventional manner by a small magnet which is not illustrated. The retract can be effected in a controlled manner by urging the member 20 to move at a predetermined velocity and in a specified direction until it engages one of the stops 28 and 30 and thus stops moving. It is important that the member 20 not crash into either of the stops 28 and 30 at its highest possible velocity, because this may result in physical damage to the structure of actuator 12, such as member 20 or the stop 28 or 30. Thus, the velocity to which the member 20 is urged at the time of a power failure must be something substantially less than its highest possible velocity.

Ideally, the processor 130 would be used to effect the controlled retract of the member 20 in this manner. The processor 130 receives information regarding the position and velocity of the member 20 in a conventional and not-illustrated manner from servo signals read by the read/write head 32 from tracks on the rotating magnetic disk. Thus, the processor has position and velocity information from which it could effect a controlled retract. However, at the time of a power failure, there is insufficient power to continue operating the processor 130 in a reliable manner for any significant period of time.

On the other hand, there is sufficient power to operate a less complex circuit for a brief period of time which is sufficient to permit a controlled retract of the member 20. Therefore, upon a power failure, the switching control circuit 80 causes the contact of electronic switch 124 to move out of engagement with terminal 126 and into engagement with terminal 122, so that the output of amplifier 120 is controlling the input 89 to junction 88. Switching control circuit 80 maintains the contact of switch 124 in engagement with the terminal 122 until power has substantially completely failed. The input 116 to junction 114 has a magnitude and polarity which specify the desired velocity and direction of movement for the member 20 during the power failure. The output of junction 114 is supplied through elements 120, 124, 88 and 90 to the input of the driver circuit 70, so that the driver circuit 70 applies to the actuator 12 current which is intended to bring the member 20 to the desired direction and velocity of movement.

During this mode of power-down operation, the switching circuit 80 periodically uses signal S2 to briefly open both of the switches 76 and 78, in order to interrupt the driving coupling of the circuit 70 to the actuator 12. As a result, the current through coil 26 and sense resistor 77 goes to zero, which in turn causes the voltages across sensor resistor 77 and the internal resistance of the actuator 12 to go to zero. A brief but finite amount of time is required for the current through the coil to go to zero, because it takes a finite time to dissipate the energy stored in the coil (Ldi/dt), and until this energy is dissipated it causes a current to flow. Thus, and as discussed above, the only voltage present at the terminals of the actuator 12 will be the back-emf voltage Vbe. After opening the switches 76 and 78, the switching control circuit 80 waits a brief time interval sufficient to allow the current through coil 26 to go to zero, and then uses the signal S3 to move the contacts of switches 96 and 98 so that they are engaging the terminals 100 and 102. Since the sense resistor 77 has no current flowing through it, and is thus generating no voltage, the back-emf voltage Vbe from the coil 26 of actuator 12 will be applied directly across capacitor 94. As discussed previously, this voltage is directly proportional to the actual velocity of the member 20.

The switching control circuit 80 then waits a brief interval of time which is sufficient for the voltage on capacitor 94 to be adjusted to equal the back-emf voltage Vbe from coil 26. The switching control circuit 80 then moves the contacts of switches 96 and 98 so that they are again engaging the terminals 104 and 108, after which the capacitor 94 holds the back-emf voltage Vbe and applies it to the input of buffer 106. Then, after waiting another short time interval, the switching control circuit 80 uses signal S2 to again close both of the switches 76 and 78, in order to again drivingly couple the driver circuit 70 to the actuator 12. The buffer 106 effectively forwards the back-emf voltage Vbe from the capacitor 94 to the junction 114, which determines the difference between the desired velocity 116 and the actual velocity represented by Vbe, in order to produce an appropriate output to amplifier 120 for controlling the actuator driver circuit 70. Through this feedback control of velocity, the member 20 can be more accurately and rapidly accelerated or decelerated to the desired velocity and direction of travel.

While keeping the contact of switch 124 in engagement with terminal 122, the switching control circuit 80 periodically opens switches 76 and 78, moves the contacts of switches 96 and 98 from terminals 104 and 108 to terminals 100 and 102, and then back to terminals 104 and 108, and then closes the switches 76 and 78. Thus, there is a periodic sampling of the back-emf voltage Vbe on the coil 26, with the voltage on capacitor 94 being periodically adjusted during the sampling to conform to Vbe, and then holding the sampled Vbe voltage until the next sampling operation.

Figure 3:
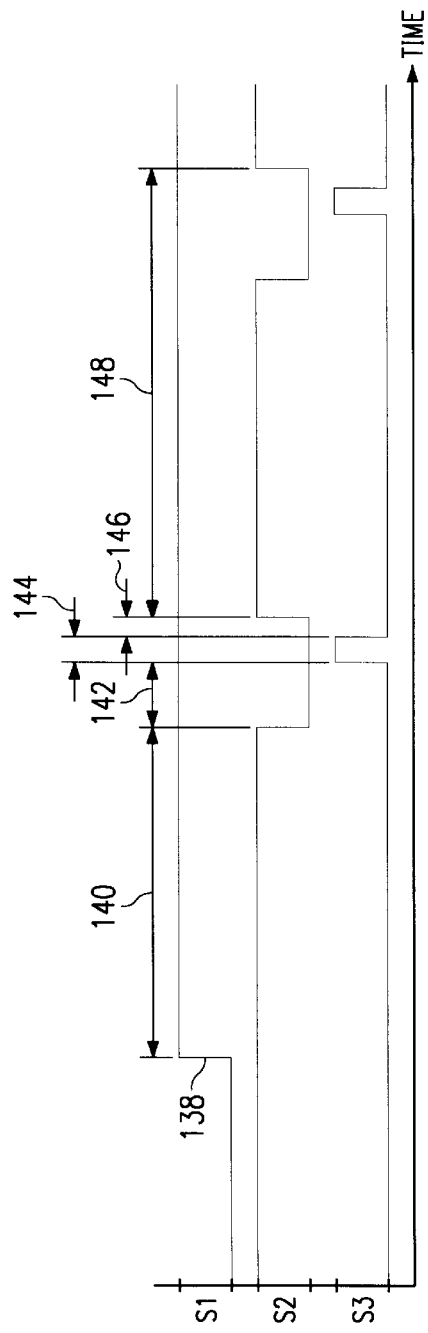
FIG. 3 is a timing diagram showing the interrelationship of certain control signals generated by a switching control circuit which is a component of the actuator control circuit in the embodiment of FIG. 1.

FIG. 3 is a timing diagram which depicts the operation of the switching control circuit 80. During normal operation, represented at the left end of the timing diagram, the switching control circuit 80 keeps the signal S1 low in order to keep the contact of switch 124 in engagement with terminal 126, keeps the signal S2 high in order keep the switches 76 and 78 closed, and keeps the signal S3 low in order to keep the contacts of switches 96 and 98 in engagement with the terminals 104 and 108.

When power begins to fail, the switching control circuit 80 changes the signal S1 from low to high at 138, in order to move the contact of switch 124 from terminal 126 to terminal 122, and thereafter maintains the signal S1 in this state throughout the power failure. Following the transition 138, for a time interval 140, the signal S2 is used to keep the switches 76 and 78 closed so that the driver circuit 70 drives the actuator 12. Then, the control circuit 80 changes the signal S2 in order to open the switches 76 and 78, and waits a predetermined time interval 142 which is sufficient to permit the current through the actuator coil 26 to go to zero. Then, the control circuit 80 uses the signal S3 to switch the contacts of switches 96 and 98 over to the terminals 100 and 102 for a time interval 144, in order to permit the back-emf voltage Vbe from the coil 26 to be applied to the capacitor 94. At the end of the interval 144, the signal S3 is used to move the contacts of switches 96 and 98 back to the terminals 104 and 108. The control circuit 80 then delays for another predetermined time interval 146, and then uses signal S2 to close the switches 76 and 78 in order to restore the driving coupling from the driver circuit 70 to the actuator 12. The sequence which includes time intervals 140, 142, 144 and 146 then repeats in a cyclic manner until power fails, the next such cycle being shown at 148. A suitable sampling rate may be 500–1500 Hz.

In FIG. 3, the length of the time interval 146 could optionally be set to be zero. Further, immediately following the transition 138, the very first time interval 140 could optionally be zero, so that the transition 138 would be immediately followed by time interval 142.

Figure 4:
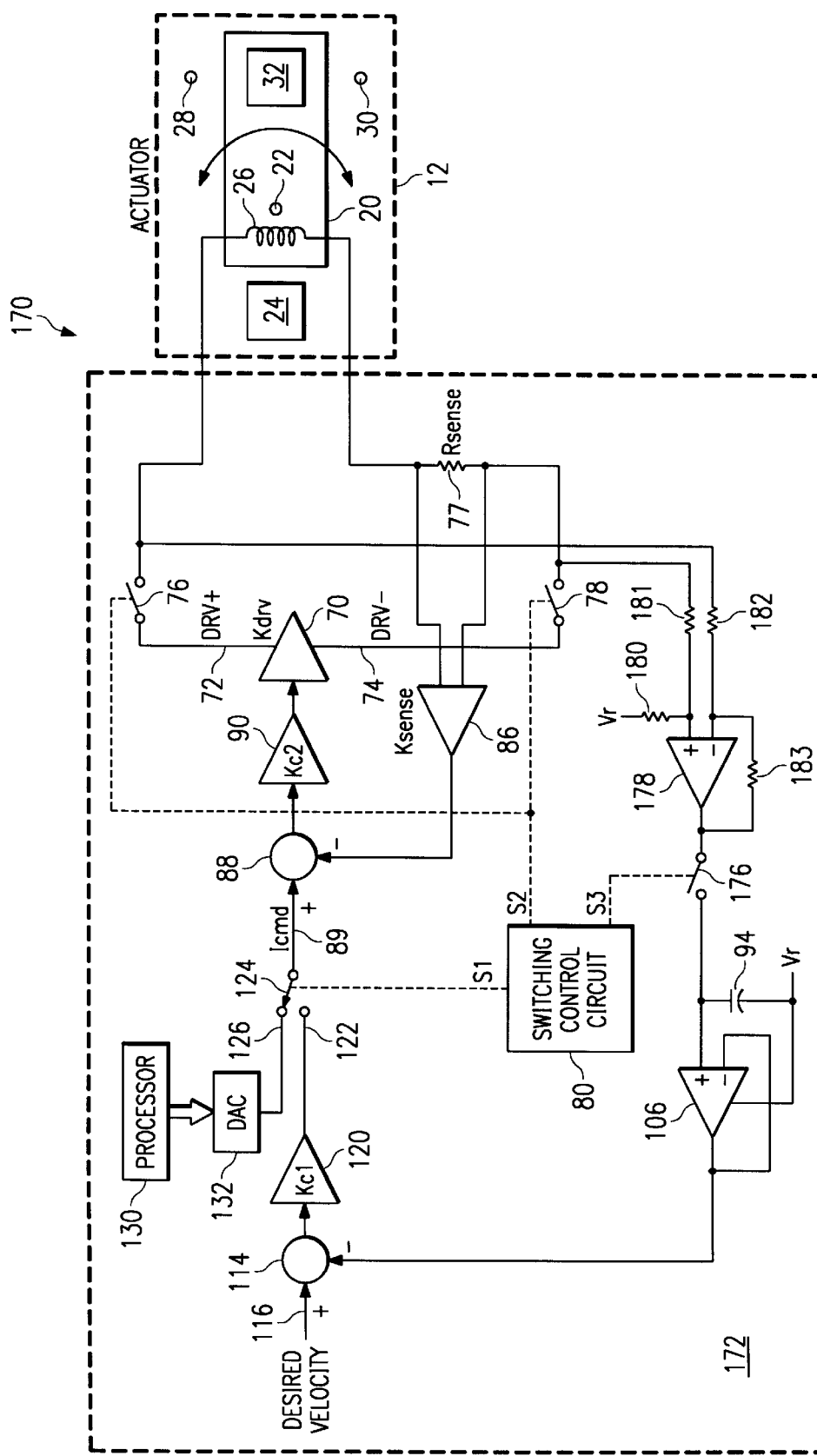
FIG. 4 is a diagrammatic view of a system which is an alternative embodiment of the system shown in FIG. 1, and which embodies the present invention.

FIG. 4 is a diagrammatic view of a system which is designated by reference numeral 170, and which is an alternative embodiment of the system shown in FIG. 1. Elements which are identical to those in FIG. 1 are identified with the same reference numerals, and are not described again in detail. The following discussion focuses on the differences between FIGS. 4 and 1.

More specifically, the electronic switches 96 and 98 of FIG. 1 are replaced in FIG. 4 with an electronic switch 176, a differential amplifier 178, and four resistors 180–183. The capacitor 94 has one end coupled to a first input of buffer 106, and its other end coupled to the reference voltage Vr. The resistor 180 has one end coupled to the reference voltage Vr, and the other end coupled to a first input of the differential amplifier 178. The resistor 181 has one end coupled to the node between switch 78 and resistor 77, and the other end coupled to the first input of amplifier 178. The resistor 182 has one end coupled to the node between switch 76 and coil 26, and the other end coupled to a second input of the amplifier 178. The resistor 183 has one end coupled to the second input of amplifier 178, and its other end coupled to the output of amplifier 178. The switch 176 is coupled between the output of amplifier 178 and the first input of the buffer 106. The switch 106 is open during normal operation of the system 170 when the signal S3 is deactuated, and is closed when the signal S3 is actuated to effect sampling.

The control circuit 14 of FIG. 1 and the control circuit 172 of FIG. 4 can each be implemented in a single integrated circuit. In the embodiment of FIG. 1, capacitor 94 may have a value of approximately 1,000 pF, whereas the embodiment of FIG. 4 permits the use of a capacitor 94 with a much smaller value, such as 20 pF. Since a small capacitor typically uses less area and power in an integrated circuit than a larger capacitor, the embodiment of FIG. 4 may be implemented in an integrated circuit with a low cost and low power consumption.

The present invention provides numerous technical advantages. An example of one such technical advantage is that the measurement of the back-emf voltage of the actuator coil is measured directly from the actuator at a time when the current through the actuator is zero, thereby obtaining a measurement of back-emf voltage with an accuracy superior to that of known techniques. In particular, since the current through the coil is zero in the approach according to the invention, the measurement is independent of resistance within the actuator, whereas known techniques which indirectly determine the back-emf voltage are based on measurements taken while current is flowing through the actuator, and thus have inaccuracies due to indeterminate supplemental voltages resulting from actuator resistances that can dynamically vary. A further advantage is that use of the accurately measured back-emf voltage for feedback control reduces or avoids undesired velocity changes of the moveable member of the actuator due to changing load losses. Still another technical advantage is that the invention uses a small amount of dedicated circuitry in conjunction with other circuitry that is typically present in known actuator control circuits, thereby minimizing the amount of additional circuitry required, which in turn minimizes the added cost, complexity and power consumption.

Although two embodiments have been illustrated and described in detail, it should be understood that various changes, substitutions and alterations can be made therein without departing from the scope of the present invention. For example, although the disclosed embodiments include an actuator of the type known as a voice coil motor, the invention encompasses the use of other types of actuators. Further, although the disclosed embodiments use electronic switches to effect and interrupt electrical couplings between various devices, it will be recognized that other approaches may be used to achieve the same result, such as the use of devices or drivers with outputs that can be tied together and selectively disabled or tri-stated. Another example is that, although the disclosed embodiments use a capacitor as a voltage holding device, other devices such an inductor could be used to hold a given state of a signal. As yet another example, the disclosed embodiments both use a digital processor to originate actuator control during normal operation, but a variety of other analog or digital circuits could be used to originate control signals without departing from the present invention.

It should also be recognized the direct connections disclosed herein could be altered, such that two disclosed components or elements are coupled to one another through an intermediate device or devices without being directly connected, while still realizing the present invention. Other changes, substitutions and alterations are also possible without departing from the spirit and scope of the present invention, as defined by the following claims.

What is claimed is:

1. An apparatus for controlling an actuator which has a moveable member and which has a coil that influences movement of the member, comprising:
   an actuator driver circuit having an input and an output;
   a first electronic switching circuit having first and second states in which said first electronic switching circuit respectively effects and interrupts an electrical coupling between said output of said driver circuit and the coil;
   a voltage holding circuit;
   a second electronic switching circuit having first and second states in which said second electronic switching circuit respectively effects and interrupts an electrical coupling between the coil and said voltage holding circuit, wherein when said second electronic switching circuit is in the second state said voltage holding circuit has applied thereto a voltage which represents a back-emf of the coil, the back-emf of the coil representing an actual velocity of the member, said voltage holding circuit thereafter holding the voltage while said second electronic switching circuit is in the first state thereof;
   feedback circuitry responsive to the voltage held by the voltage holding circuit and responsive to an input representing a desired velocity of the member, said feedback circuitry being operative to cause the member to be urged to move at the desired velocity by controlling said driver circuit as a function of a difference between the desired velocity of the member and the actual velocity of the member as represented by the voltage from said voltage holding circuit; and
   a switching control circuit operative to periodically change said first electronic switching circuit from the second state thereof to the first state thereof and subsequently from the first state thereof back to the second state thereof, and operative during the first state of said first electronic switching circuit for changing said second electronic switching circuit from the first state thereof to the second state thereof and then from the second state thereof back to the first state thereof.

2. An apparatus according to claim 1, wherein said switching circuit control circuit is operative to change said second electronic switching circuit from the first state thereof to the second state thereof a predetermined time interval after said first electronic switching circuit has been changed from the first state thereof to the second state thereof, said predetermined time interval being sufficient to allow a current through the coil to decrease substantially to zero.

3. An apparatus according to claim 1, wherein said switching control circuit is operative to change said second electronic switching circuit from the first state thereof to the second state thereof a first predetermined time interval after said first electronic switching circuit has been changed from the second state thereof to the first state thereof, and to change said second electronic switching circuit from the second state thereof to the first state thereof a second predetermined time interval before said first electronic switching circuit is changed from the first state thereof back to the second state thereof, said first predetermined time interval being sufficient to allow a current through the coil to decrease substantially to zero.

4. An apparatus according to claim 1, including:
   a processor; and
   a third electronic switching circuit for coupling a selected one of said processor and said feedback circuitry to said input of said driver circuit;
   wherein said switching control circuit is coupled to said third electronic switching circuit and is operative to specify which of said processor and said feedback circuitry is to be coupled by said third electronic switching circuit to said input of said driver circuit.

5. An apparatus according to claim 1,
   wherein said voltage holding circuit includes a capacitor; and
   wherein when said second electronic switching circuit is in the second state thereof, said second electronic switching circuit applies across said capacitor a voltage which is present across the coil.

6. An apparatus according to claim 1,
   wherein said voltage holding circuit includes a capacitor;
   wherein said output of said driver circuit includes two terminals;
   wherein said first electronic switching circuit includes first and second switches which are each coupled between a respective one of said terminals and a respective end of the coil, said first and second switches each being open in the first state of said first electronic switching circuit and each being closed in the second state of said first electronic switching circuit; and
   wherein said second electronic switching circuit includes third and fourth switches which are each coupled between a respective end of said capacitor and a respective end of the coil, said third and fourth switches each effecting an electrical coupling between a respective end of said capacitor and a respective end of the coil in the second state of said second electronic switching circuit, and each interrupting the electrical coupling between a respective end of said capacitor and a respective end of the coil in the first state of said second electronic switching circuit.

7. An apparatus according to claim 1, including a differential amplifier having an output, and having first and second inputs which are each coupled to a respective end of the coil;

wherein said voltage holding circuit includes a capacitor;

wherein said output of said driver circuit includes two terminals;

wherein said first electronic switching circuit includes first and second switches which are each coupled between a respective one of said terminals and a respective end of the coil, said first and second switches each being open in the first state of said first electronic switching circuit and each being closed in the second state of said first electronic switching circuit; and wherein said second electronic switching circuit includes a third switch which is coupled between said output of said differential amplifier and one end of said capacitor, said third switch being open in the first state of said second electronic switching circuit and being closed in the second state of said second electronic switching circuit.

8. An apparatus for controlling an actuator which has a moveable member and which has a coil that influences movement of the member, comprising:

an actuator driver circuit having an input and having two output terminals;

a first electronic switching circuit having first and second states and having first and second switches which are both open in said first state of said first electronic switching circuit and both closed in said second state of said first electronic switching circuit, said first and second switches each being coupled between a respective said output terminal of said actuator driver circuit and a respective end of the coil;

a voltage holding circuit which includes a capacitor;

a second electronic switching circuit having first and second states in which said second electronic switching circuit respectively effects and interrupts an electrical coupling between the coil and said capacitor, wherein when said second electronic switching circuit is in the second state said capacitor has applied thereto a voltage which represents a back-emf of the coil, the back-emf of the coil representing an actual velocity of the member, said capacitor thereafter holding the voltage while said second electronic switching circuit is in the first state thereof;

feedback circuitry responsive to the voltage held by the voltage holding circuit and responsive to an input representing a desired velocity of the member, said feedback circuitry being operative to output a feedback signal which is a function of a difference between the desired velocity of the member and the actual velocity of the member as represented by the voltage from said capacitor;

a circuit which includes a processor and is operative to output a control signal;

a third electronic switching circuit operative to supply to said input of said actuator driver circuit a selected one of the feedback signal and the control signal, wherein when said third electronic switching circuit is supplying the feedback signal to said input of said actuator driver circuit the feedback signal controls said driver circuit in a manner causing the member to be urged to move at the desired velocity; and a switching control circuit which, when said third electronic switching circuit is supplying the feedback signal to said driver circuit, is operative to periodically change said first electronic switching circuit from the second state thereof to the first state thereof and subsequently from the first state thereof back to the second state thereof, and operative during the first state of said first electronic switching circuit for changing said second electronic switching circuit from the first state thereof to the second state thereof and then from the second state thereof back to the first state thereof, said second electronic switching circuit being changed from the first state thereof to the second state thereof a predetermined time interval after said first electronic switching circuit has been changed from the first state thereof to the second state thereof, said predetermined time interval being sufficient to allow a current through the coil to decrease substantially to zero.

9. An apparatus according to claim 8, wherein said switching circuit control circuit is operative to change said second electronic switching circuit from the second state thereof to the first state thereof a predetermined time interval before said first electronic switching circuit is changed from the first state thereof back to the second state thereof.

10. An apparatus according to claim 8, wherein said second electronic switching circuit includes third and fourth switches which are each coupled between a respective end of said capacitor and a respective end of the coil, said third and fourth switches each effecting an electrical coupling between a respective end of said capacitor and a respective end of the coil in the second state of said second electronic switching circuit, and each interrupting the electrical coupling between a respective end of said capacitor and a respective end of the coil in the first state of said second electronic switching circuit.

11. An apparatus according to claim 8, including a differential amplifier having an output, and having first and second inputs which are each coupled to a respective end of the coil; and wherein said second electronic switching circuit includes a third switch which is coupled between said output of said differential amplifier and one end of said capacitor, said third switch being open in the first state of said second electronic switching circuit and being closed in the second state of said second electronic switching circuit.

* * * * *